United States Patent [19]
Gonthier et al.

[11] Patent Number: 5,694,512
[45] Date of Patent: Dec. 2, 1997

[54] COMPACT TUNABLE WAVELENGTH INDEPENDENT ALL-FIBER OPTICAL ATTENUATOR AND METHOD OF MAKING SAME

[75] Inventors: François Gonthier, Montreal; Robert G. Files, Mount Albert, both of Canada

[73] Assignee: Framatome Connectors Canada Inc., Scarborough, Canada

[21] Appl. No.: 677,272

[22] Filed: Jul. 9, 1996

[51] Int. Cl.$^6$ .................................................. G02B 6/36
[52] U.S. Cl. .................. 385/140; 65/402; 65/475
[58] Field of Search ..................... 385/43, 140, 96, 385/99, 32; 65/401, 402, 475

[56] References Cited

U.S. PATENT DOCUMENTS

| | | | |
|---|---|---|---|
| 4,529,262 | 7/1985 | Ashkin et al. | 385/140 |
| 4,557,556 | 12/1985 | Decker, Jr. | 385/140 |
| 4,557,557 | 12/1985 | Gleason et al. | 385/140 |
| 4,697,869 | 10/1987 | So et al. | 385/140 |
| 4,728,170 | 3/1988 | Robertson | 385/140 |
| 4,884,859 | 12/1989 | Yamamoto et al. | 385/140 |
| 4,997,248 | 3/1991 | Syowe | 385/43 |
| 5,058,979 | 10/1991 | Yamauchi et al. | 385/43 |
| 5,109,468 | 4/1992 | Tamulevich et al. | 385/140 |
| 5,285,516 | 2/1994 | Wong | 385/140 |
| 5,311,614 | 5/1994 | Caron et al. | 385/140 |
| 5,321,790 | 6/1994 | Takahashi et al. | 385/140 |
| 5,459,804 | 10/1995 | Stowe | 385/43 |

FOREIGN PATENT DOCUMENTS

| | | | |
|---|---|---|---|
| 1-50002 | 2/1989 | Japan | 385/140 |
| 150003 | 2/1989 | Japan | 385/140 |
| 1-222205 | 9/1989 | Japan | 385/140 |
| 2-228609 | 9/1990 | Japan | 385/140 |

*Primary Examiner*—John Ngo
*Attorney, Agent, or Firm*—Ware, Fressola, Van Der Sluys & Adolphson LLP

[57] ABSTRACT

A compact, tunable, wavelength independent, all-fiber attenuator is produced by heating a single-mode fiber to create at least one taper therein through capillarity rather than through pulling, pushing or twisting the fiber. The attenuator may be tuned to achieve the desired value of attenuation and wavelength independence by imparting a small bend to the taper. The attenuator may be a fixed value attenuator or a variable attenuator. When a fixed value attenuator is desired, the tapered and bent structure is encapsulated in an adhesive and glued onto a substrate.

9 Claims, 4 Drawing Sheets

COMPACT TUNABLE WAVELENGTH INDEPENDENT ALL-FIBER OPTICAL ATTENUATOR AND METHOD OF MAKING SAME

FIELD OF INVENTION

This invention relates to an optical attenuator and more particularly to a compact, tunable, wavelength independent all-fiber optical attenuator produced by creating a tapered structure on a single-mode fiber and, eventually, bending said structure to adjust or control optical loss, which makes it possible to achieve a wavelength independent attenuator with the desired value of attenuation. The method of making such attenuator is also part of the invention.

BACKGROUND OF THE INVENTION

In optical fiber communication systems, optical detectors are calibrated to function linearly in a given range of optical power. However, depending on the quality of the different connections and components in the system and on the power budget allowed in the design, the optical power available at the detector is often greater than the desirable upper limit of operation of the detector. An optical attenuator can be used to solve this problem. In other applications, optical attenuators can be used to balance the optical power between several lines of a system. They are also useful in calibrating systems at different power levels. In system design, they can be used in planning future development of a network by increasing the power budget available in case new connections are made.

The attenuators used in systems often have a fixed value of attenuation, and are usually packaged in a small robust case. The attenuation value normally covers a range from 1 dB to 25 dB or more. Attenuators used in testing equipment or procedure may have adjustable values. In both cases, attenuators that have a direct connection to the optical fiber have an advantage. A compact attenuator can also be easily integrated in a patch cord or cable, or even in a connector casing. Another important property is to have a very small wavelength dependence in the wavelength window or windows of operation. Furthermore, it is often very important for the attenuator to have a very low back reflection in order not to perturb the optical fiber system.

In the prior art, various types of attenuators have been described and the following are examples of prior patents in this area:

U.S. Pat. No. 4,529,262 of Jul. 16, 1985 discloses an inline single-mode fiber attenuator which requires special polarization preserving fibers. It is not compact and is wavelength dependant, although it can be tuned.

U.S. Pat. Nos. 4,557,556 and 4,557,557 both of Dec. 10, 1985 describe methods of fabricating attenuators where ends of two optical fibers are abutted and melted and then cooled to form the optical attenuator. By special alignment or misalignment of their ends and then by either surface tension or distortion while in molten state, an attenuator with a desired fixed optical loss can be produced. Such attenuators are wavelength dependent, fixed value attenuators which may produce undesirable back reflections.

In U.S. Pat. No. 4,697,869 of Dec. 6, 1987, a variable attenuator is described. The principle of operation used in this case is a precise bending of the fiber. This attenuator is all-fiber and variable, but is not compact and is wavelength dependent.

U.S. Pat. No. 4,728,170 of Mar. 1, 1988 describes an attenuator integrated in a single-mode fiber. By diffusing the optical core of a single-mode optical fiber or by splicing the fiber with no-core between two ends of a single-mode fiber, the signal is mostly lost in the cladding of the fiber. This attenuator is compact and stable. However, the fabrication process requires a special fiber and precise alignment of the splices. Also, the operating principle involved gives the attenuator a small wavelength independence. This application may work well in a wavelength window of a few tens of nanometers, but when the wavelength variation is important, over several hundred nanometers, it would not be suitable.

U.S. Pat. No. 4,884,859 of Dec. 5, 1989 discloses an all-fiber optical attenuator made by heating a part of an optical fiber and applying a tension and/or twist to form an optical attenuator area having fine cracks in the heated part of the optical fiber. This is a wavelength dependent fixed value type of attenuator.

In U.S. Pat. No. 5,109,468 of Apr. 28, 1992, two well-known methods of creating an attenuation on an optical fiber are disclosed. The first is a misaligned splice in an optical fiber. If done well, the splice has a fixed value attenuation, low back reflection and can be packaged in a compact form. The second method is also based on a misalignment in a fiber but in this case through small bends. Both methods have the same basic problem as for example, in U.S. Pat. No. 4,728,170, that is, they may function well in a wavelength window of a few tens of nanometers, but are unsatisfactory when the wavelength independence is large, over a few hundred nanometers.

U.S. Pat. No. 5,285,516 of Feb. 8, 1994 discloses fiber attenuators characterized by a high level of wavelength insensitivity. These are fabricated in a manner similar to that of U.S. Pat. No. 4,557,556, but in addition there is provided an adjustment of the relative axial positioning and overlapping of the respective end portions of the fiber segments to achieve a desired degree of attenuation. This type of attenuator may present problems of back reflection.

In U.S. Pat. No. 5,311,614 a continuously variable fiber optic attenuator is disclosed which is produced by bending in a controlled manner at least a portion of an optical fiber which is supported by a resilient support member. This is not a compact attenuator since it requires a rather complex support member.

Finally, U.S. Pat. No. 5,321,790 of Jun. 14, 1994 discloses an all-fiber or inline type optical attenuator which is formed by heating a portion of a single continuous optical fiber and then physically deforming said portion in the axial direction while maintaining it in a heated state. This is a wavelength dependent type of attenuator which cannot be used over a wide range of wavelengths.

SUMMARY OF THE INVENTION

According to the present invention there is provided an all-fiber attenuator which is compact, tunable, wavelength independent over a range of several hundred nanometers and has negligible back reflection. Depending on the final packaging, it can be either fixed and be very stable with the environment, or have an adjustable value. It is made by creating a tapered structure on a single-mode fiber and, if necessary, bending said structure to adjust or control the optical loss of the attenuator. One or a plurality of tapered sections may be created. The taper in the tapered section or sections of the fiber is formed by heating the fiber without subjecting it to any physical distortion such as pulling, pushing, twisting or the like. The taper is thus produced by the displacement of viscous glass through capillarity rather than elongation or the like. Once formed, the attenuator may be adjusted or tuned by bending the tapered section until the desired attenuation value is obtained within a given tolerance.

The typical tolerance is 10% of the dB value, i.e., 5 dB±0.5 dB, 10 dB±1 dB, etc. This fixed attenuation value is maintained over a large wavelength range, typically 1200 nm to 1600 nm. The attenuator is then encapsulated, for example in an adhesive, to maintain the bend. This primary package can then be placed in a bigger more sturdy case such as a fiber protective jacket.

The attenuation of the structure is due to coupling in the forward propagating cladding modes. The modes are lost in the primary adhesive package and in the fiber protective jacket. Since there is no discontinuity in the fiber, this attenuator has negligible back reflection. Its typical size is smaller that 3 mm long, and the bend angle, when bending is performed, is normally less than 10°.

The attenuator of the present invention is fabricated by creating one or more tapered sections on the single-mode fiber by approaching a small heat source, such as a micro-torch, to the fiber. Once the heat source is removed and basic attenuation is obtained, the level of attenuation can be adjusted or controlled by bending the tapered structure or structures. One way the bend can be achieved is by compressing the structure. The attenuator can then be encapsulated in an adhesive, which also provides another way of controlling the attenuation level.

The present invention uses coupling with cladding modes through a taper or several tapers in a fiber, but with the new taper design, cladding modes are not allowed to interfere in phase at the end of the coupler structure. Because the amount of power coupled to cladding modes is far less wavelength dependent than the phase difference between the cladding modes, the result is an almost wavelength independent attenuated spectral response. Furthermore, an additional control of the amount of power coupled to the cladding modes is obtained by bending the tapered fiber, resulting in a tunable wavelength independent attenuator, and by changing the external medium in which the attenuator can be encapsulated.

BRIEF DESCRIPTION OF THE DRAWINGS

The invention will now further be described with reference to the appended drawings, in which.

DETAILED DESCRIPTION

Figure 1:
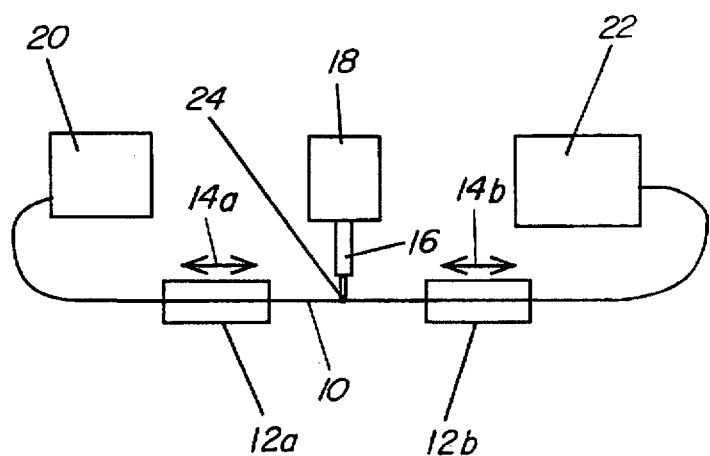
FIG. 1 shows the attenuator fabrication setup.

In the drawings, the same elements are designated by the same numerals in all figures.

To avoid back reflection in the attenuator, there should be no discontinuity in the fiber, such as a splice or a stress point, which causes back reflections. This implies that the attenuator must be made directly on the single-mode fiber. The tapered structure resulting from fusing a fiber was found to be ideal for this purpose, because it enables to create optical losses essentially with no back reflections.

A typical setup to facilitate such a structure is illustrated in FIG. 1. The optical fiber 10 is held between two fiber holders 12a and 12b which are mounted on travelling stages. The stages (not shown) can be moved closer or farther apart as shown by arrows 14a and 14b and can be motorized and computer controlled. A heat source, such as a micro-torch 16, is also mounted on X-Y-Z travelling stages 18 so that it can be moved closer to the fiber or away from it. To have a reproducible manufacturing process it is desirable that all travelling stages be provided with precise and repeatable displacements, preferably computer controlled.

Furthermore, a light source 20 and an optical power meter or detector 22 are needed to monitor the output power of the fiber during fabrication of the attenuator. The light source 20 can be single wavelength, but it is desirable to have at least two wavelengths, close to the limits of the wavelength window of operation, i.e., 1300 nm and 1550 nm for an operating window of 1200 nm to 1600 nm, to be able to verify the wavelength dependence of the device. Using a tunable wavelength source or a broad band source with a monochromator or spectrum analyzer may also be desirable, but it was found that a two wavelength measurement is usually sufficient to verify that the optical properties of the attenuator are within specifications.

Figure 2:
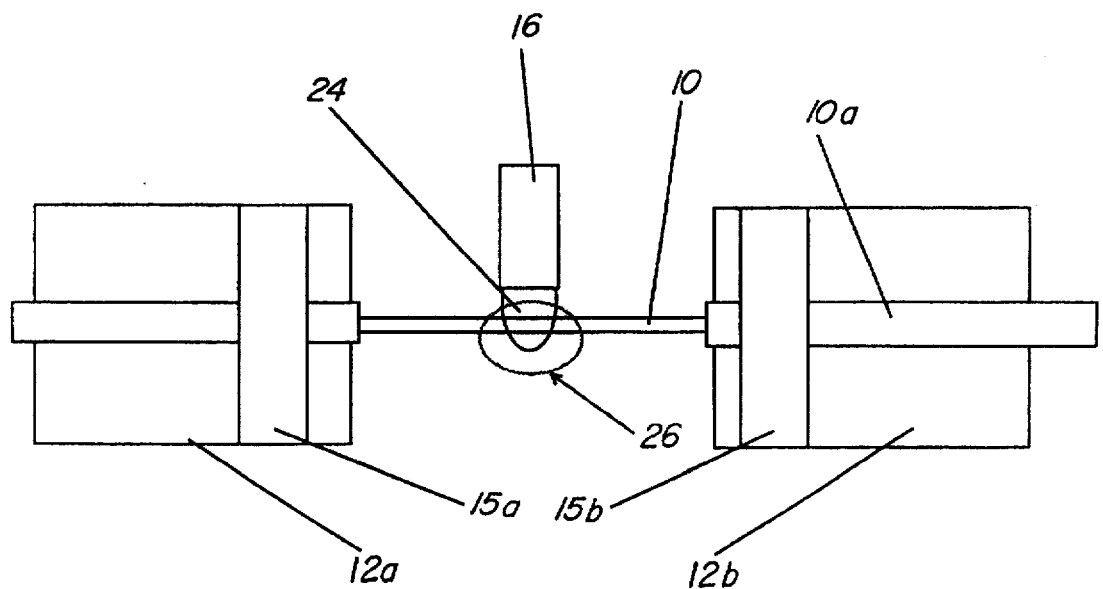
FIG. 2 shows the single-mode fiber, with its protective polymer jacket removed, held by fiber clamps and holders and the position of the micro-torch relative thereto.
Figure 3:
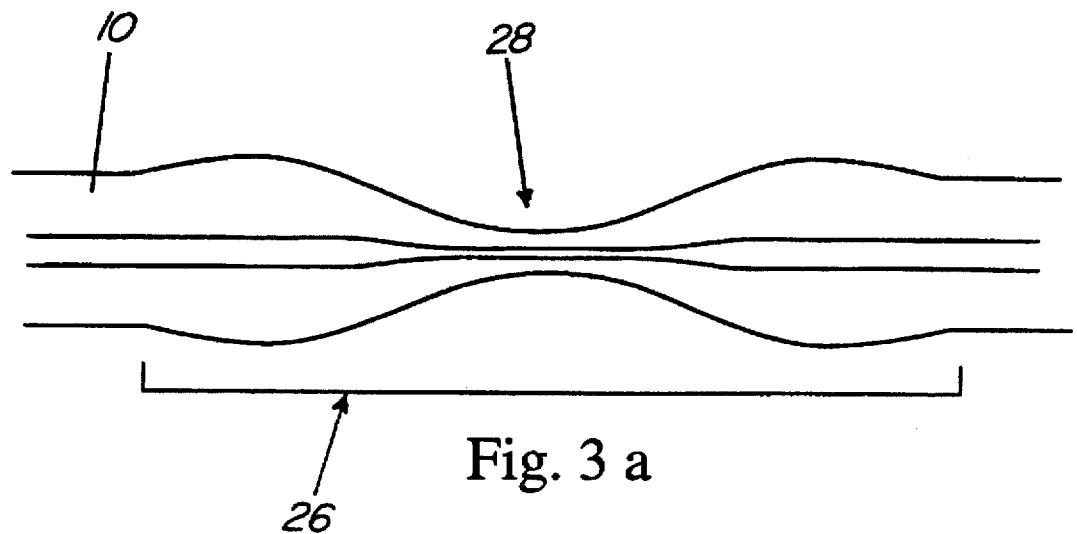
FIG. 3a shows the fiber, after tapering, with a single taper, and FIG. 3b with a double taper structure.
Figure 3:
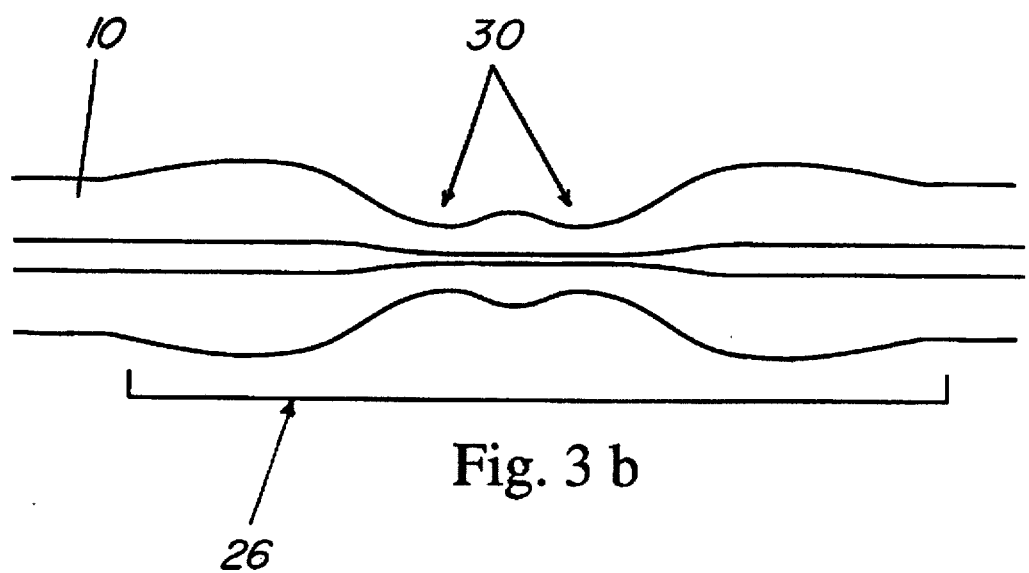

In a preferred embodiment, the heat source used is a small oxygen-propane flame 24 which has a parabolic profile 0.5–1 mm wide, as shown especially in FIG. 2. Once the fiber 10 has been stripped of its protective jacket which is shown as 10a in FIG. 2, it is cleaned and placed between the fiber holders 12a, 12b which have clamps 15a, 15b for holding said fiber in place and are mounted on travelling stages as already mentioned. The fiber 10 is not placed under tension, but should be straight to avoid uncontrolled deformations. The heat source, which must be hot enough to melt silica, and which is shown as flame 24 in FIG. 2, is then placed close to the fiber 10 at a point where the silica glass starts to melt. Actually, as shown in region 26, the fiber 10 should preferably penetrate into the cone of the flame 24 to achieve a good melting deformation in the fiber. This deformation or taper 28 shown in FIG. 3a creates an attenuation in the fiber 10, which generally increases with time. Depending on desired properties and conditions, a plurality of tapers can thus be created. Two such tapers 30 are shown in FIG. 3b, although, if desired, additional tapers may be formed by successive heating steps.

This tapering process differs from prior art references in that there is very little or no pull on the fiber during this fusion. It was surprisingly found that given the right shape and position of the flame, wavelength independence can be achieved with this no-pull taper, as opposed to strong wavelength dependence of pulled tapers. It was deduced that this deformation causes coupling between the core and cladding modes, but due to the short length of the device, the cladding mode excited in the taper region 26 does not have the length to get back in phase with the fundamental core mode. As for the best taper shape to achieve attenuation, it was found that the design is not unique and that even with the same heat source, some shapes produced better results for given levels of attenuation than others. For a given setup, the taper can be found experimentally using a dual wavelength monitoring system and varying the flame parameters (shape, position, temperature) and the time, until the response with the smallest wavelength dependence is found.

Figure 4:
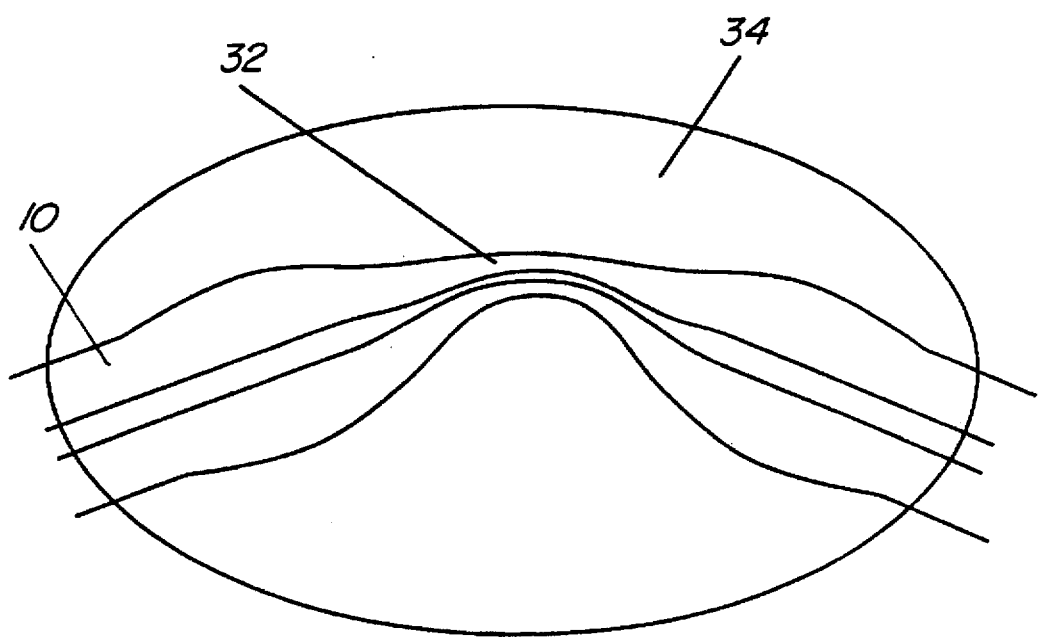
FIG. 4 shows the tapered fiber bent to obtain the desired attenuation value with the tapered section being encapsulated in adhesive.

To obtain desired attenuation values, the output power is monitored in real time by optical power meter 22 (FIG. 1) during the fabrication process and stopped at a predetermined attenuation target value. This process can be as short as a few seconds or as long as several hours, depending on the heat source. The attenuation value with the flame on the fiber 10 is usually different from the value with the flame off, but the process is reproducible enough to have a strong correlation, making an automatic stop of the process possible. The taper length is typically one to two millimeters long, but may be smaller or longer depending on desired conditions. Once stopped, the value of desired attenuation may not yet be achieved and the wavelength independence may not be perfect. This can be corrected or adjusted by pulling on the fiber 10, but more often by pushing and compressing the tapered structure, and thus creating a small bend 32 in the taper, as shown in FIG. 4. The small bend 22 can also be realized by a proper rotation of the fiber holders 12a, 12b (FIG. 1). The bending property enables the tuning of the attenuator and helps in making the attenuation wavelength insensitive. The resulting attenuator can be encapsulated in an adhesive encapsulation 34. It was also observed that with the bend, some particular taper structures remained wavelength insensitive over a wide range of mean attenuations, thus making it possible to realize wavelength independent variable attenuators. Such variable attenuators may be encapsulated in a flexible encapsulation or a package allowing varied bending, for instance, by external mechanical means. The bending is very reproducible and can be repeated several hundreds of times without breaking the structure.

Figure 5:
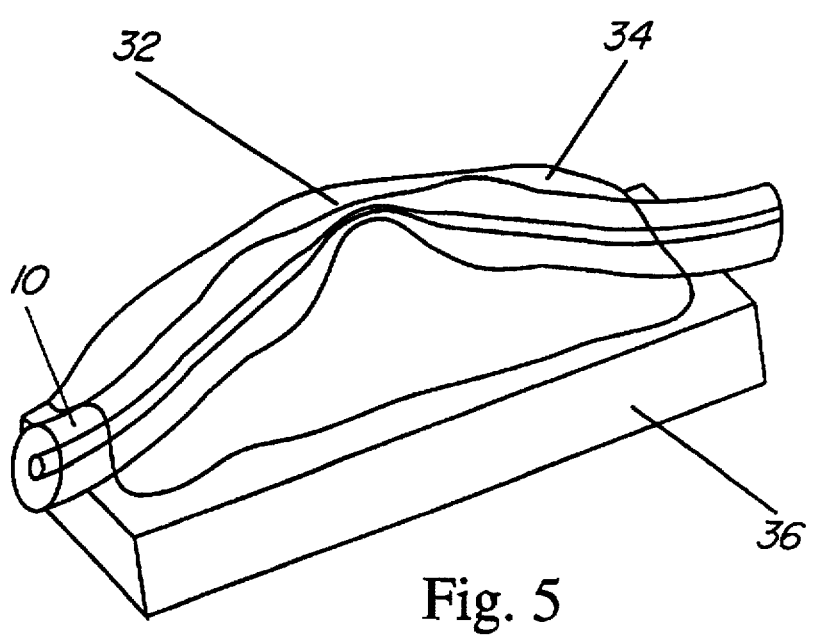
FIG. 5 shows an example of packaging of the attenuator including a small grooved substrate.

If the attenuator is to be used as a fixed value attenuator, the tapered and bent structure can be glued onto a substrate 36 to obtain an attenuator as shown in FIG. 5, and/or simply encapsulated in the adhesive encapsulation or glue 34. This may change the attenuation property so that the change in attenuation due to the glue must be taken into account when the design of the attenuator is made. The final attenuator package is usually larger, in particular if the attenuator is incorporated in an optical fiber patch cord or in a fiber connector.

Figure 6:
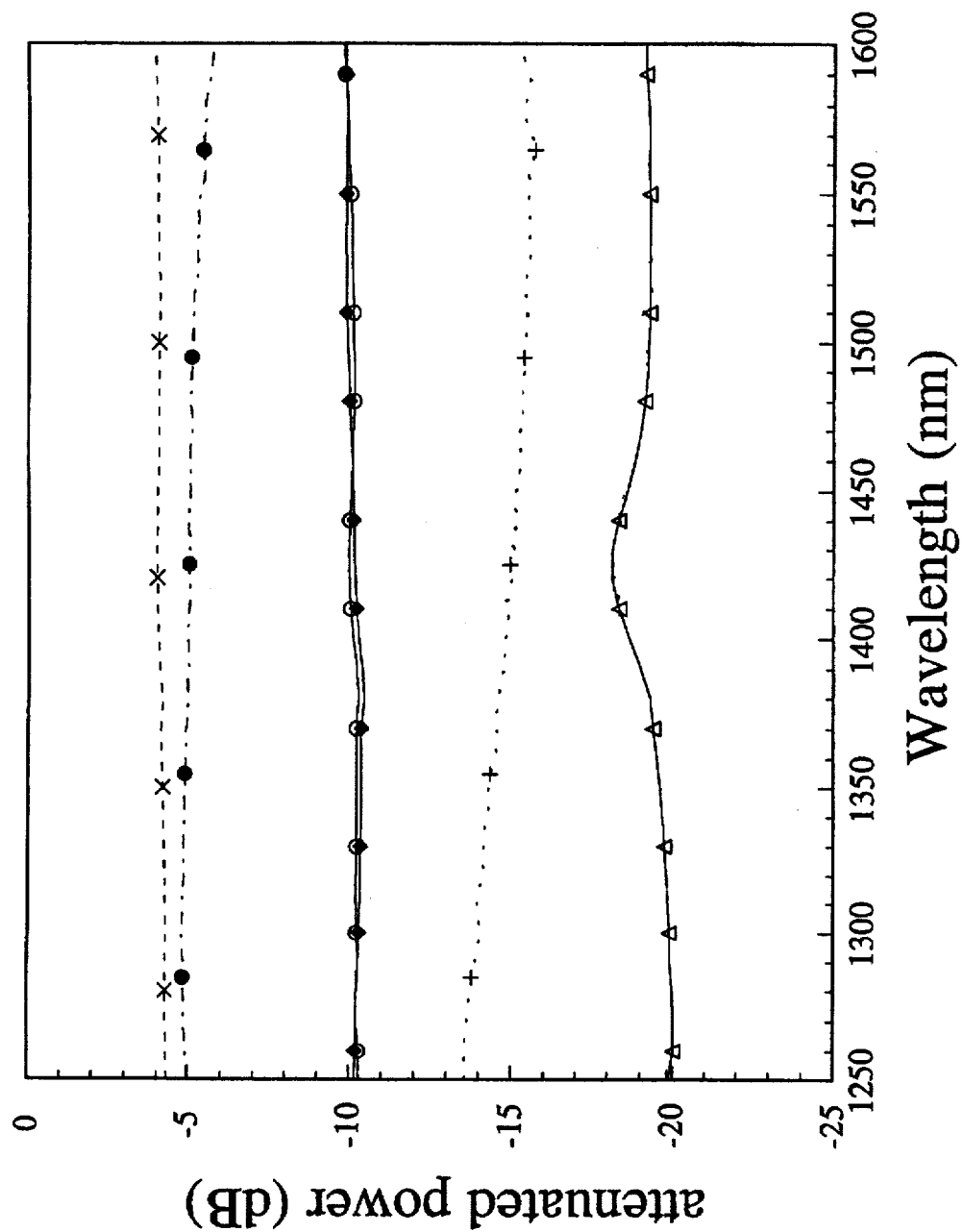
FIG. 6 shows various wavelength responses of fabricated and packaged attenuators.

Several examples of spectral response of packaged attenuators are illustrated in FIG. 6 to demonstrate that small wavelength dependence and the broad range of mean attenuation values are achievable. The curves in this FIG. 6 were produced by attenuators manufactured in accordance with the present invention using Corning SMF 28™ fiber having a core diameter of 9 μm. The uppermost curve shown in FIG. 6 was obtained from an attenuator produced with a double taper, such as illustrated in FIG. 3b, without bending. All the other curves shown in FIG. 6 were obtained from attenuators produced in accordance with the present invention and bent to various degrees to achieve the desired attenuated power from 5 to 20 dB. When encapsulated in the proper materials, these fixed value attenuators are very stable to a change of environment, such as temperature.

It should be understood that this invention is not limited to the preferred embodiments described above but that other procedures and modifications, obvious to those skilled in the art, are included.

We claim:

1. Method of making a compact, tunable, wavelength independent all-fiber optical attenuator which comprises heating a single-mode fiber so as to produce at least one taper therein by displacement of viscous glass through capillarity, until a desired value of attenuation is achieved.

2. Method according to claim 1, wherein a plurality of tapers are produced by successive heating steps.

3. Method according to claim 1, further comprising tuning the attenuator by imparting a small bend to the taper.

4. Method according to claim 3, wherein the bend is imparted by pushing on the fiber and thus compressing the taper, until a predetermined attenuation value and wavelength independence are achieved.

5. Method according to claim 4, wherein the attenuator is encapsulated in an adhesive.

6. Method according to claim 5, wherein the attenuator is further mounted on a suitable substrate.

7. Method according to claim 4, further comprising packaging the attenuator so as to allow varied bending, thereby producing a variable attenuator.

8. A method according to claim 3, wherein the small bend imparted is less than 10 degrees.

9. A method according to claim 3, wherein the step of tuning makes the attenuator insensitive over a wavelength range of 1200 to 1600 nanometers.

* * * * *

UNITED STATES PATENT AND TRADEMARK OFFICE
CERTIFICATE OF CORRECTION

PATENT NO. : 5,694,512
DATED : December 2, 1997
INVENTOR(S) : F. Gonthier et al.

It is certified that error appears in the above-indentified patent and that said Letters Patent is hereby corrected as shown below:

On title page, item

[56], line 9, please delete "Syowe" and insert -- Stowe --.

Signed and Sealed this

Sixteenth Day of June, 1998

Attest:

BRUCE LEHMAN

Attesting Officer

Commissioner of Patents and Trademarks